(12) United States Patent
Chevalier

(10) Patent No.: US 8,142,856 B2
(45) Date of Patent: Mar. 27, 2012

(54) HYDROPHOBING MINERALS AND FILLER MATERIALS

(75) Inventor: Pierre Maurice Chevalier, Lille (FR)

(73) Assignee: Dow Corning Corporation, Midland, MI (US)

(*) Notice: Subject to any disclaimer, the term of this patent is extended or adjusted under 35 U.S.C. 154(b) by 21 days.

(21) Appl. No.: 11/995,763

(22) PCT Filed: Jul. 13, 2006

(86) PCT No.: PCT/EP2006/064193
§ 371 (c)(1),
(2), (4) Date: Jul. 15, 2008

(87) PCT Pub. No.: WO2007/009935
PCT Pub. Date: Jan. 25, 2007

(65) Prior Publication Data
US 2008/0286474 A1    Nov. 20, 2008

Related U.S. Application Data

(60) Provisional application No. 60/699,479, filed on Jul. 15, 2005.

(30) Foreign Application Priority Data

Dec. 20, 2005 (GB) .................... 0525825.6

(51) Int. Cl.
*B05D 3/02* (2006.01)

(52) U.S. Cl. .................... 427/387; 264/134; 524/457

(58) Field of Classification Search .............. 264/109; 427/372.2
See application file for complete search history.

(56) References Cited

U.S. PATENT DOCUMENTS

| | | | |
|---|---|---|---|
| 3,382,083 A | | 5/1968 | Marsden et al. |
| 3,455,710 A | | 7/1969 | Nitzsche et al. |
| 3,623,895 A | * | 11/1971 | Nitsche et al. ............... 106/2 |
| 5,051,129 A | * | 9/1991 | Cuthbert et al. ............... 106/2 |
| 5,135,805 A | * | 8/1992 | Sellers et al. ............... 442/386 |
| 5,190,804 A | * | 3/1993 | Seto et al. ............... 428/192 |
| 6,133,466 A | * | 10/2000 | Edelmann et al. ............... 556/440 |
| 7,057,001 B2 | * | 6/2006 | Bachon et al. ............... 528/29 |
| 2002/0082338 A1 | * | 6/2002 | Furuya et al. ............... 524/588 |
| 2004/0266935 A1 | * | 12/2004 | Okuda et al. ............... 524/457 |
| 2006/0069198 A1 | * | 3/2006 | Okuda et al. ............... 524/457 |

FOREIGN PATENT DOCUMENTS

| | | |
|---|---|---|
| DE | 4124892 A1 | 3/1992 |
| EP | 0047747 A1 | 5/1985 |
| EP | 0927748 A1 | 12/1998 |
| EP | 0978525 A2 | 2/2000 |
| JP | 2005-219000 | 8/2005 |
| WO | WO 81/01702 A1 | 6/1981 |
| WO | 0230846 A1 | 4/2002 |
| WO | 0230847 A1 | 4/2002 |
| WO | 0234838 A1 | 5/2002 |
| WO | WO 02/090287 A1 | 11/2002 |

OTHER PUBLICATIONS

English language abstract for EP0978525 extracted from espacenet.com, Jan. 15, 2008.
English language abstract for WO 02/34838 A1 extracted from espacenet.com database, dated Feb. 7, 2011, 57 pages.
Article: Nicola Soger, Hydrolytische Darstellung, Stabilisierung und massenspektrometrische Charakterisierung von Silopxanen und Siloxanolen, May 3, 1971, Vom Fachbereich Chemie De Universitat Hannover, 178 pages.
English language abstract for Hydrolytische Darstellung, Stabilisierung und massenspektrometrische Charakterisierung von Silopxanen und Siloxanolen, dated May 3, 1971, 178 pages.
International Search Report for Application No. PCT/EP2006/064193 dated Dec. 21, 2006, 2 pages.

* cited by examiner

*Primary Examiner* — Maria Veronica Ewald
*Assistant Examiner* — Robert J Grun
(74) *Attorney, Agent, or Firm* — Howard & Howard Attorneys PLLC

(57) ABSTRACT

A method of preparing a hydrophobic mineral and/or filler material, for example a gypsum material, comprises (i) preparing a hydrolyzate containing polysiloxanes by hydrolyzing a hydrolysable silane or hydrolysable silane mixture in the presence of an acid hydrolysis catalyst; and (ii) combining the polysiloxane hydrolyzate with the mineral and/or filler, and optionally water and/or a catalyst for condensation of the hydrolysate.

31 Claims, No Drawings

HYDROPHOBING MINERALS AND FILLER MATERIALS

RELATED APPLICATIONS

This application claims priority to and all the advantages of International Patent Application No. PCT/EP2006/064193, filed on Jul. 13, 2006, which claims priority to U.S. Provisional Patent Application No. 60/699,479, filed on Jul. 15, 2005, and Great Britain Patent Application No. GB 0525825.6, filed on Dec. 20, 2005.

This invention relates to a process of making minerals and tiller materials, particularly gypsum and gypsum products that are hydrophobic and/or water resistant. In particular, hydrophobicity and/or water resistance is provided by adding during the process, certain aqueous solutions of polysiloxanes obtained by prehydrolyzing under acidic conditions certain hydrolyzable silanes such as alkylalkoxysilanes, arylalkoxysilanes, alkenylalkoxysilanes, and mixtures thereof.

Gypsum products such as gypsum plasterboard are made by mixing stucco with water to produce a slurry. The slurry is fed onto a sheet of cardboard, covered with a second sheet of cardboard, and passed over a moulding platform to be shaped into an encased strip. The strip of gypsum plasterboard is initially soft, but then quickly sets as the calcium sulphate hemihydrates (stucco) rehydrates back to calcium sulphate dehydrate (gypsum), and therefore hardens, and is cut into separate panels of gypsum plasterboard.

In particular, gypsum plasterboard is produced from basic materials including paper in the form of cardboard, stucco, water, starch, and additives such as accelerators and foams. Other additives for making gypsum plasterboard are also added, including retarders such as proteins and organic acids; viscosity modifying agents; anti-burning agents; water-resisting chemicals such as polysiloxanes and wax emulsions; glass fibres; fire-resistance enhancers such as vermiculite, clays, and fumed silica; and polymeric compounds such as polyvinyl alcohol. As noted, wallboards or plasterboards are large thin gypsum panels covered with cardboard. This invention relates to an improved process for the incorporation of polysiloxane in gypsum, a gypsum product or another mineral or filler to impart water resistance.

WO-A-81/01702 describes a process for the preparation of a plaster mortar containing gypsum powder, water, conventional additives and ballast material, comprising adding said materials during the process of manufacture, in the preparation of the gypsum powder, in the mixing of the powder and water or to the mixing water or to the wet mortar, alkoxysilanes and optionally a solvent and optionally a tenside/emulsifier/surfactant and optionally a silanol polymerisation catalyst and optionally substances providing for acid or basic reaction conditions in the mixing water and optionally a fine powder consisting of reactive silica.

In one embodiment of the present invention there is provided a method of preparing a mineral and/or filler material comprising:
(i) preparing a hydrolyzate containing polysiloxanes by hydrolyzing a hydrolysable silane or hydrolysable silane mixture in the presence of an acid hydrolysis catalyst; and
(ii) combining the polysiloxane hydrolyzate with minerals and/or fillers, and optionally water and/or a catalyst for condensation of the hydrolysate.

The process of the invention can be used for the treatment of a wide range of minerals or fillers in powder form.

The method of the invention can be used in preparing other types of hydrophobic and/or water resistant materials such as minerals and fillers. Some representative examples include non-hydrated, partially hydrated, or hydrated fluorides, chlorides, bromides, iodides, chromates, carbonate hydroxides, hydroxides, phosphates, hydrogen phosphates, nitrates, oxides, and sulphates of sodium, potassium, magnesium, calcium, and barium; titanium dioxide, zinc oxide, aluminium oxide, aluminium trihydroxide, vermiculite, silica including fumed silica, fused silica, precipitated silica, quartz, sand, and silica gel; rice hull ash, ceramic and glass beads, zeolites, hydrous calcium silicate, silica-carbon black composite, functionalized carbon nanotubes, cement, fly ash, slate flour, bentonite, clay, mica, kaolin, talc, calcium carbonate, wollastonite, polymeric fillers, rubber particles, wood flour, wood fibres, cellulose and cellulose-containing products, aramid fibres, nylon fibres, cotton fibres, or glass fibres.

One example is in the preparation of hydrophobic gypsum and gypsum products, and the invention will be described in terms of gypsum although it can be applied to other minerals and fillers. As used herein, the term gypsum is intended to mean all solid forms of calcium sulphate including calcium sulphate dehydrate $CaSO_4.2H_2O$. The term stucco is intended to mean calcium sulphate hemihydrate $CaSO_4.0.5H_2O$, commonly known as plaster of Paris or calcined gypsum but for the sake of this invention should also be understood to be dehydrate and anhydrate derivatives thereof. Stucco is made by heating gypsum to remove $3/2H_2O$ molecule. The method of preparing hydrophobic and/or water resistant gypsum and gypsum products according to the invention, can be used to prepare hydrophobic gypsum and gypsum products derived from all sources of gypsum and stucco, including natural gypsum (calcium sulphate dihydrate), synthetic gypsum from plasterboard waste stations, or synthetic gypsum (desulphogypsum) produced at coal tired power plants that convert sulphur dioxide to synthetic gypsum, and other forms of synthetic gypsum such as titanogypsum, fluorogypsum or phosphogypsum. The method of the invention is particularly suitable for treating stucco in powder form, as used in the preparation of gypsum products such as gypsum plasterboard.

Hence one embodiment is particularly directed to a method of making hydrophobic and/or water resistant gypsum and gypsum products by:
(i) preparing a hydrolyzate containing polysiloxanes by hydrolyzing a hydrolysable silane or hydrolysable silane mixture under acidic conditions;
(ii) combining the polysiloxane hydrolyzate with stucco and/or gypsum, and optionally water and/or a basic catalyst, to form a slurry; and
(iii) discharging the slurry onto a support or mould, and drying the slurry to form a hydrophobic gypsum or hydrophobic gypsum product.

As used herein, the terms hydrolyzate containing polysiloxane and polysiloxane hydrolyzate are intended to include the various species resulting from the hydrolysis of alkoxysilanes, chlorosilanes, and/or acetoxysilanes, including combinations of monomeric hydroxysilanes such as organotrihydroxysilanes, linear, cyclic, or branched hydroxysiloxanes in oligomeric or polymeric form, and any species containing both the hydroxyl and remaining hydrolysable groups such as organodihydroxymonoalkoxysilanes and organomonohydroxydialkoxysilanes, in oligomeric or polymeric siloxane forms, resulting either from the partial hydrolysis or the residual esterification of hydroxyl group into alkoxy groups, and the residual alcoholysis of siloxanes into hydroxy or alkoxy functional silanes, or shorter siloxane mixtures. Although the post-distillation of the alcohol by-product does reduce significantly the re-generation of residual alkoxysilanes, alkoxyoligosiloxanes, and alkoxypolysiloxanes, it is not a requirement for obtaining low water uptake, and the consequent hydrophobing properties of gypsum and gypsum products.

The hydrolysable organosilane in accordance with the present invention may comprise one or more silanes, each silane being the same or different and comprising one or more alkoxy groups and/or one or more acetoxy groups and/or one or more halide groups (typically chloride groups) and mixtures thereof. Hence, the hydrolysable organosilane can for example be an alkoxysilane or acetoxysilane or a silane containing both alkoxy and acetoxy groups bonded to a silicon atom. The alkoxysilane can be a monoalkoxysilane, dialkoysilane, trialkoxysilane, or tetra-alkoxysilane. The alkoxysilane can contain the same or different alkoxy groups. Optionally, it may contain one or more halogenated substituted organic groups. The alkoxysilane can be an alkylalkoxysilanes, arylalkoxysilanes or alkenylalkoxysilane. Mixtures of alkoxysilanes can be used, or a mixture of alkoxysilane with acetoxysilane can be used.

One group of organosilanes suitable for use in the method of the invention are trialkoxysilanes having the formula RSi(OR')$_3$, wherein R represents an alkyl or alkenyl group having 1 to 18 carbon atoms and R' represents an alkyl group having 1 to 4 carbon atoms. Examples of alkyl trialkoxysilanes include methyltrimethoxysilane, methyltriethoxysilane, methyltri-n-propoxysilane, methyltri-i-propoxysilane, methyltri-n-butoxysilane, methyltri-i-butoxysilane, methyltri-sec-butoxysilane, methyltri-t-butoxysilane, ethyltrimethoxysilane, ethyltriethoxysilane, ethyltri-n-propoxysilane, ethyltri-i-propoxysilane, ethyltri-n-butoxysilane, ethyltri-i-butoxysilane, ethyltri-t-butoxysilane, n-propyltrimethoxysilane, n-propyltriethoxysilane, isopropyltrimethoxysilane, n-butyltrimethoxysilane, isobutyltrimethoxysilane, isobutyltriethoxysilane, pentyltrimethoxysilane, pentyltriethoxysilane, hexyltrimethoxysilane, n-octyltrimethoxysilane, n-octyltriethoxysilane, iso-octyltrimethoxysilane, chloromethyltrimethoxysilane, chloromethyltriethoxysilane, chloroethyltrimethoxysilane, chloroethyltriethoxysilane, chloropropyltrimethoxysilane, chloropropyltriethoxysilane, trifluoropropyltrimethoxysilane, trifluoropropyltriethoxysilane, trifluoropropyltri-n-propoxysilane, trifluoropropyltri-i-propoxysilane, trifluoropropyltri-n-butoxysilane, trifluoropropyltri-t-butoxysilane, methyldimethoxyethoxysilane, methyldimethoxy-n-propoxysilane, methyldimethoxy-i-propoxysilane, methyldimethoxy-n-butoxysilane, methyldimethoxy-t-butoxysilane, methyldiethoxy-n-propoxysilane, methyldiethoxy-i-propoxysilane, methyldiethoxy-n-butoxysilane and methyldiethoxy-t-butoxysilane. Examples of alkenyl trialkoxysilanes include vinyltrimethoxysilane, vinyltriethoxysilane, vinyltri-isopropoxysilane, allytrimethoxysilane, allytriethoxysilane, hexenyltrimethoxysilane and hexenyltriethoxysilane or mixtures thereof. We have found that mixtures containing at least two of methyltripropoxysilane and/or methyltrimethoxysilane and/or methyltriacetoxysilane and/or alkenyltrialkoxysilane and/or alkenyltriacetoxysilane are particularly effective in the process of the invention.

Some examples of dialkyldialkoxysilanes that can be used in the method of the invention include dimethyldimethoxysilane, dimethyldiethoxysilane, ethylmethyldimethoxysilane, ethylmethyldiethoxysilane, isobutylmethyldimethoxysilane, isobutylmethyldiethoxysilane and trifluoropropylmethyldimethoxysilane. Examples of trialkylalkoxysilanes that can be used in the method of the invention include trimethylmethoxysilane, tri-n-propylmethoxysilane, trimethylethoxysilane, triethylethoxysilane, tri-n-propylethoxysilane, tri-i-propylethoxysilane and tri-n-butylethoxysilane.

Examples of tetra-alkoxysilanes include tetramethoxysilane, tetraethoxysilane, tetra-n-propoxysilane, tetra-i-propoxysilane, tetra-n-butoxysilane and tetra-t-butoxysilane.

Some examples of arylalkoxysilanes that can be used in the method of the invention include phenyldimethylmethoxysilane, phenylethylmethylmethoxysilane, diphenylmethylmethoxysilane, triphenylmethoxysilane, triphenylethoxysilane, phenylethyldimethoxysilane, phenylethyldiethoxysilane, phenylmethyldimethoxysilane, phenylmethyldiethoxysilane, phenylmethoxydiethoxysilane, phenyltrimethoxysilane, phenyltriethoxysilane and phenylmethyltrimethoxysilane.

Some examples of alkenyalkoxysilanes that can be used in the method of the invention include vinyldimethylmethoxysilane, vinyldimethylethoxysilane, vinylmethyldimethoxysilane, vinylmethyldiethoxysilane, vinylphenyldiethoxysilane, triallylethoxysilane, diallylmethylethoxysilane and allyldimethylethoxysilane.

If desired, other types of hydrolysable organosilanes such as acetoxysilanes can be used. The acetoxysilanes can be monoacetoxysilanes, diacetoxysilanes, triacetoxysilanes, tetra-acetoxysilanes, and mixtures thereof. Some examples of suitable acetoxysilanes include phenylmethyldiacetoxysilane, vinylmethyldiacetoxysilane, methyltriacetoxysilane, ethyltriacetoxysilane, propyltriacetoxysilane, butyltriacetoxysilane, phenyltriacetoxysilane, vinyltriacetoxysilane and tetra-acetoxysilane.

Examples of silanes containing both alkoxy and acetoxy groups are methyldiacetoxymethoxysilane, methylacetoxydimethoxysilane vinyidlacetoxymethoxysilane, vinylacetoxydimethoxysilane, methyldiacetoxyethoxysilane and methylacetoxydiethoxysilane.

The acid hydrolysis catalyst in step (I) of the present invention may be any suitable acid which can be used in hydrolysis processes. Examples of suitable inorganic acids include sulphuric acid, phosphoric acid, and hydrochloric acid. Some examples of suitable organic acids include acetic acid, formic acid, oxalic acid, citric acid, trichloroacetic acid, and sulfonic acids such as dodecylbenzenesulfonic acid. The pH preferred during step (i) of the process can be from 0.1-6, preferably between 3-5. The acid is added to the hydrolysis solution in the amount of 0.1-1.0 percent by weight, based on the total weight of water and alkoxysilanes in the hydrolysis solution. Organotrialkoxysilanes are commonly dissolved in water by shaking or stirring vigorously with acidified water until a clear solution results. Trialkoxysilanes hydrolyze stepwise in water to the corresponding silanols which condense to polysiloxanes. The hydrolysis of organotrialkoxysilanes is relatively rapid while the condensation reaction is slower. The hydrolysis of silanes is typically conducted at a high dilution in water. We have found according to the present invention, however, that improved results are achieved, particularly for hydrophobic gypsum, if the hydrolysate is prepared at a relatively high concentration of silane in water. While in general hydrolysis can be carried out at a silane concentration of 0.1 to 90% in water, concentrations greater than about 5% by weight may be preferred. The concentration of silane in water can for example be from 10 or 15% up to 50% or even greater.

Following hydrolysis and condensation, the solution may, if required be at least partially freed of the acid, and this is accomplished by neutralization with a base. A mild base is generally preferred since over-neutralization can result in product instability. Following neutralization, the solution is generally distilled to remove the by-product alcohol formed during hydrolysis, and the distilled solution can be filtered to separate any excess neutralizing agent and any neutralization products in the composition. While alcohol stripping is preferable, it is not a requirement. When using other hydrolysable silanes such as acetoxysilanes and chlorosilanes, the hydrolysis is similar, however the by-product is an acid, i.e., acetic acid and hydrochloric acid, instead of an alcohol. Preferably the acid is removed or partially neutralized with a neutralizing agent. It will be appreciated that in accordance with the present invention in many instances the mineral and/or filler materials introduced in step (ii) may be sufficiently basic in water to effect the partial neutralisation without the need for any additional basic material. Examples of such minerals include calcium carbonate or calcium sulphate such as stucco.

When used, the catalyst utilised in step (ii) or catalysing condensation of the hydrolysed silane can for example be a base catalyst, an organic compound of a metal such as a metal alkoxide, or a fluoride salt, or a combination of any of these.

When the catalyst used in step (ii) is a base it may be any suitable strong or weak base. Some examples of suitable bases include calcium oxide powder, calcium carbonate, solid calcium hydroxide or liquid lime, calcium acetate, sodium hydroxide, potassium hydroxide, sodium methylate, sodium carbonate, sodium bicarbonate, sodium borate, sodium acetate, solutions of a siliconate or silicate salt such as a sodium, potassium, calcium or aluminium siliconate or silicate, fly ash, amines such as triethylamine, ethylenetriamine, butylamine, octylamine, dibutylamine, monoethanolamine, diethanolamine, triethanolamine, diethylenetriamine, triethylenetetramine, cyclohexylamine, benzylamine, diethylaminopropylamine, xylylenediamine, triethylenediamine, guanidine, diphenylguanidine, morpholine, laurylamine or N,N-dimethylbenzylamine, ammonium hydroxide, ammonium carbonate, ammonium acetate, a phosphazene base, potassium acetate, magnesium carbonate, dolomite, potassium carbonate, sodium carbonate, magnesium oxide, cement such as Portland cement, sulphate resisting cement, blast furnace cement, pozzolanic cement, white cement, high alumina cement or expansive cement, and mixtures thereof. The pH generated in an aqueous slurry of stucco and organosilane with the base catalyst can be from pH 8-14. Strong bases, capable of generating a pH of at least 10, preferably about 10-13, are effective catalysts in the process of the invention provided that the mineral or filler is not adversely affected by strong base. Sodium hydroxide is one example of a strong base. It can be added in solid form, e.g. flakes, or as an aqueous solution. Weaker bases, generating a pH of 8-10 in an aqueous slurry of stucco and organosilane, are also effective catalysts used alone or in conjunction with an organic compound of a metal. The base catalyst is added to the stucco slurry in an amount sufficient to achieve the desired pH, typically in an amount of 0.1-1.0% based on the total weight of the stucco slurry. The basic catalyst functions as a condensation catalyst, and enhances formation of higher molecular weight siloxane species which improve anchorage of the siloxanes to the stucco or other mineral imparting durable hydrophobicity.

The organic compound of a metal which may be used as the catalyst that is combined with the polysiloxane hydrolyzate and the mineral or filler in step (ii) of the present invention may for example be a compound of titanium, tin, aluminium, zirconium or vanadium. It can for example be a metal alkoxide or a metal carboxylate salt or a chelated metal compound. Preferred titanium compounds are titanium alkoxides, otherwise known as titanate esters, for example a titanium tetraalkoxide such as titanium tetra-n-butoxide (tetrabutyl titanate), tetraethyl titanate, tetranonyl titanate or tetraisopropoxy titanate. A titanium chelate can be used, for example a chelated titanate ester such as bis(acetylacetonyl) diisopropyl titanate or diisopropoxy titanium bis(ethylacetoacetate). The titanium tetraalkoxides are usually more catalytically active than the titanium chelate compounds. Analogous zirconium or vanadium compounds, for example zirconate or vanadate esters, can alternatively or additionally be used. Preferred aluminium compounds are aluminium alkoxides, for example aluminium sec-butanolate, or aluminium chelate compounds.

If the organic compound of a metal is a tin compound it is usually a tin carboxylate or organotin carboxylate, for example dibutyltin dilaurate, dioctyltin dilaurate, stannous octoate, stannous acetate, stannous oxalate, stannous naphthenate, dibutyltin dioctoate, dibutyltin bis(isooctyl maleate) or dioctyltin bis(isooctyl thioglycolate), although an organotin chelate compound such as dibutyltinbis(2,4-pentadionate)tin can be used. The combination of an organic compound of tin with an amine such as laurylamine can be particularly effective as a catalyst.

The amount of organic compound of a metal added as catalyst can for example be 0.01-2% based on the total weight of the stucco slurry, preferably 0.02-0.5%.

The fluoride salt which may be used as a catalyst in step (ii) of the present invention is preferably an ammonium fluoride of the formula $[R''_4N]F$ in which each R'' can be a hydrogen atom or a monovalent, optionally substituted hydrocarbon radical, for example methyl, ethyl, n-butyl, n-propyl, isopropyl or benzyl, adducts thereof with carbonyl compounds such as a beta-ketocarboxylic acid esters or a 1,3-diketone, a metal fluoride such as potassium fluoride, cesium fluoride, zinc fluoride or copper fluoride, an organometallic fluoride such as dibutyltin fluoride, or an organic or inorganic ammonium hydrogen fluoride, phosphonium fluoride, phosphonium hydrogen fluoride, tetrafluoroborate, hexafluorosilicate or fluorophosphate. Preferred ammonium fluorides include tetrabutylammonium fluoride, tetramethylammonium fluoride, benzylmethylammonium fluoride and methylammonium fluoride and adducts thereof with carbonyl compounds such as acetylacetone, methyl acetoacetate, 2-ethylhexyl acetoacetate, isopropyl acetoacetate or ethyl acetoacetate. The amount of fluoride salt added as catalyst can for example be 0.01-5% based on the total weight of the stucco slurry, preferably 0.02-1%.

Combinations of two or more different hydrolysis catalysts can be used in step (ii), for example a base catalyst can be used in conjunction with a metal alkoxide such as an alkoxide of titanium, zirconium, vanadium or aluminium, or another organic compound of a metal such as an organic compound of tin and/or with a fluoride salt.

The hydrolysis catalyst may be introduced to the hydrolysable organosilane and water mix shortly, typically immediately before combination with the stucco to form a slurry We have found that if the organosilane is hydrolysed in the presence of the gypsum or other mineral or filler, so that the organosilane hydrolysis product condenses to form polyorganosiloxane in the presence of the mineral or filler, the polyorganosiloxane becomes intimately incorporated in the mineral or filler.

The mixtures used in step (i) and/or step (ii) may further include other organosilicon compounds such as silane diols and hydroxyl endblocked polydimethylsiloxane fluids. Some examples include silanols, hydroxyl functional polydimethylsiloxanes, and alkoxy functional polydimethylsiloxanes. The silanols can be silanols, silanediols, or silanetriols. Some examples include trimethylsilanol, triethylsilanol, tripropylsilanol, triisopropylsilanol, tributylsilanol, triisobutylsilanol, tri-(sec-butyl)silanol, tri-(tert-butyl)silanol, tripentylsilanol, triisopentylsilanol, tri-(sec-pentyl)silanol, tri-(tert-pentyl)silanol; dimethylsilanediol, diethylsilanediol, dipropylsilanediol, diisopropylsilanediol, dibutylsilanediol, diisobutylsilanediol, di-(sec-butyl)silanediol, di-(tert-butyl)silanediol, di-pentylsilanediol, diisopentylsilanediol, di-(sec-pentyl)silanediol, di-(tert-pentyl)silanediol, methylsilanetriol, ethylsilanetriol, propylsilanetriol, isopropylsilanetriol, butylsilanetriol, isobutylsilanetriol, sec-butyl-silanetriol, tert-butylsilanetriol, pentylsilanetriol, isopentylsilanetriol, sec-pentylsilanetriol, tert-pentyl-silanetriol, triphenylsilanol, triphenylethylsilanol, triphenylpropylsilanol, diphenylsilanediol, diphenylethylsilanediol, diphenylpropylsilanediol, methylphenylsilanediol, phenylsilanetriol, and mixtures thereof. The hydroxyl functional polydimethylsiloxanes and the alkoxy functional polydimethylsiloxanes may contain terminal, pendant, or terminal and pendant, functional groups. Suitable functional polydimethylsiloxanes will generally have from 2-300 repeating units in the chain. These organosilicon compounds are capable of functioning as crosslinking agents and/or chain extenders. If such another silicon compound is used, silanol-functional polydimethylsiloxanes having 4-100 repeating units in the chain are preferred. In general the hydrolysable organosilane is hydrolysed and then condensed to form a polysiloxane, although when a silanol-functional polysiloxane is present the hydrolysable groups of the silane can condense with the silanol groups to form an extended or crosslinked polysiloxane. The weight ratio of hydrolysable organosilane to silanol-functional or alkoxy-functional polyorganosiloxane is preferably at least 1:10, more preferably at least 1:3, for example 1:1 to 10:1.

The concentration of silane hydrolysis product in water in the slurry of mineral or filler as the mineral or filler is being treated is generally about 0.1-50 percent by weight. Preferably, the amount of water is chosen so that the solution contains 0.3-20 percent by weight, most preferably about 0.3-10 percent by weight, of the hydrolyzate. When the polysiloxane hydrolyzate contains sufficient water, the addition of more water in step (ii) of the process is not required in order to form the slurry. In that instance, water is an optional component in step (ii), although it can be included when additional amounts of water are needed to form a slurry.

Optional Additives

As noted above, other additives for making gypsum plasterboard are often used in commercial operations including starch; foaming agents; wetting agents; accelerators; retarders such as proteins and organic acids; paper or pulp; viscosity modifying agents; anti-burning agents; non-silicon atom containing water-resisting chemicals such as wax emulsions; glass fibres; fire-resistance enhancers such as vermiculite, clays, and fumed silica; and polymeric compounds such as polyvinyl alcohol. One or more additives such as these may be included in step (ii) of the present process.

EXAMPLES

The following examples are set forth in order to illustrate the invention in more detail.

Example 1

To 795 milliliter of water was added under stirring acetic acid to adjust the pH to 3.6. 5 gram of methyltrimethoxysilane (MTM) was then added drop-wise under constant stirring. The aqueous mixture became clear within minutes. The mixture was used fresh or maintained under stirring for 2 days before it was packaged and stored prior to testing on stucco over time.

Example 2

To 790 milliliter of water was added under stirring, acetic acid to adjust the pH to 3.6. 10 gram of methyltrimethoxysilane was then added drop-wise under constant stirring. The mixture was used fresh or maintained under stirring for 2 days before it was packaged and stored prior to testing on stucco over time.

Example 3

To 750 milliliter of water was added under stirring, acetic acid to adjust the pH to 3.6. 50 gram of methyltrimethoxysilane was then added drop-wise under constant stirring. The mixture was used fresh or maintained under stirring for 2 days before it was packaged and stored prior to testing on stucco over time.

Example 4

To 795 milliliter of water was added under stirring, acetic acid to adjust the pH to 3.6. 5 gram of methyltriethoxysilane (MTE) was then added drop-wise under constant stirring. The aqueous mixture became clear within minutes. The mixture was maintained under stirring for 2 days before it was packaged and stored prior to testing on stucco over time.

Example 5

To 790 milliliter of water was added under stirring, acetic acid to adjust the pH to 3.6. 10 gram of methyltriethoxysilane was then added drop-wise under constant stirring. The mixture was maintained under stirring for 2 days before it was packaged and stored prior to testing on stucco over time.

Example 6

To 750 milliliter of water was added under stirring, acetic acid to adjust the pH to 3.6. 50 gram of methyltriethoxysilane was then added drop-wise under constant stirring. The mixture was maintained under stirring for 2 days before it was packaged and stored prior to testing on stucco over time.

Example 7

General Procedure

Aqueous solutions containing the polysiloxane hydrolyzate composition were prepared so that the weight of the polysiloxane hydrolyzate based on the weight of stucco was from 0.5 to 5.0 percent. To 80 gram of the aqueous solution containing the polysiloxane hydrolyzate composition was added 100 gram of stucco under vigorous stirring. No further catalyst was added, and the pH of the resulting slurry was measured to be about 6-7. The slurry was stirred for another 60 seconds and poured into disk shaped moulds. The samples were allowed to set at room temperature (20-25° C.) for 15-60 minutes. The disks separated from the moulds were gypsum disks of three centimetre in diameter and one centimetre in depth. The samples were further dried in an air circulating oven for 30 minutes at 110° C., and then for 12-24 hours at 40° C. The disks were cooled down and immersed in water for two hours. The weight of the disks before and after immersing the disks in water was measured. The water uptake expressed in percent, was used as the measure of the hydrophobing property of the polysiloxane hydrolyzate compositions. The water uptake of the disks treated with the polysiloxane hydrolyzate composition was compared to the water uptake of untreated gypsum stucco that has a value of about 40 percent. Table 1 shows results obtained by following the above procedure.

TABLE 1

WATER UPTAKE

| Example No. | Silane Used in Preparing the Hydrolyzate | Weight Percent of Hydrolyzate vs. Stucco | Age of Aqueous Hydrolyzate Prior to Testing | Water Uptake, Percent |
|---|---|---|---|---|
| Control | None | — | — | 40.1 |
| 1 | MTM | 0.5 | 2 days | 34.7 |
|   |   |   | 6 days | 31.5 |
|   |   |   | 11 weeks | 29.6 |
| 2 |   | 1 | 2 days | 14.0 |
|   |   |   | 6 days | 13.8 |
|   |   |   | 11 weeks | 12.3 |
| 3 |   | 5 | 2 days | 14.9 |
|   |   |   | 2 weeks | 14.2 |
|   |   |   | 11 weeks | 16.3 |
| 4 | MTE | 0.5 | 2 days | 37.2 |
|   |   |   | 6 days | 30.5 |
| 5 |   | 1 | 2 days | 12.3 |
|   |   |   | 6 days | 12.2 |
|   |   |   | 2 weeks | 12.0 |
| 6 |   | 5 | 2 days | 4.0 |
|   |   |   | 9 days | 6.4 |
|   |   |   | 2 weeks | 5.0 |

In Table 1, MTM designates methyltrimethoxysilane and MTE designates methyltriethoxysilane. Examples 1-6 Table 1 show that a reduction in water-absorption, and the consequent improvement in water resistance, was obtained at various loadings of the polysiloxane hydrolyzate. Table 1 also shows that good stability, and an improvement in water-absorption over time, can be obtained with the polysiloxane hydrolyzates.

Example 8

To 3,962.5 milliliter of tap water was added under stirring, acetic acid to adjust the pH to 3.6. 37.5 gram of methyltrimethoxysilane (MTM) was then added drop-wise under constant stirring. The aqueous mixture became clear within minutes. The mixture was maintained under stirring for one day before it was packaged and stored prior to testing on stucco.

Example 9

To 3,900 milliliter of tap water was added under stirring, acetic acid to adjust the pH to 3.6. 100 gram of methyltrimethoxysilane was then added drop-wise under constant stirring. The mixture was maintained under stirring for one day before it was packaged and stored prior to testing on stucco.

Example 10

To 3,962.5 milliliter of tap water was added under stirring, acetic acid to adjust the pH to 3.6. 37.5 gram of methyltriethoxysilane (MTE) was then added drop-wise under constant stirring. The aqueous mixture became clear within minutes. The mixture was maintained under stirring for one day before it was packaged and stored prior to testing on stucco.

Example 11

To 3,900 milliliter of tap water was added under stirring, acetic acid to adjust the pH to 3.6. 100 gram of methyltriethoxysilane was then added drop-wise under constant stirring. The mixture was maintained under stirring for one day before it was packaged and stored prior to testing on stucco.

Example 12

To 3,962.5 milliliter of tap water was added under stirring, acetic acid to adjust the pH to 3.6. 37.5 gram of vinyltriethoxysilane (VTE) was then added drop-wise under constant stirring. The mixture was maintained under stirring for one day before it was packaged and stored prior to testing on stucco.

Example 13

To 3,950 milliliter of tap water was added under stirring, acetic acid to adjust the pH to 3.6. 50 gram of vinyltriethoxysilane was then added drop-wise under constant stirring. The mixture was maintained under stirring for one day before it was packaged and stored prior to testing on stucco.

Example 14

To 3,900 milliliter of tap water was added under stirring, acetic acid to adjust the pH to 3.6. 100 gram of vinyltriethoxysilane was then added drop-wise under constant stirring. The mixture was maintained under stirring for one day before it was packaged and stored prior to testing on stucco.

Example 15

General Procedure

Aqueous solutions containing the polysiloxane hydrolyzate composition were prepared. The weight of the polysiloxane hydrolyzate based on the weight of stucco was from 0.5 to 5.0 percent. To 80 gram of the aqueous solution containing the polysiloxane hydrolyzate composition was added 100 gram of stucco under vigorous stirring, and several drops of a 40 weight percent aqueous solution of NaOH to adjust the pH to 12. The slurry was stirred for another 60 seconds and poured into disk shaped moulds. The samples were allowed to set at room temperature (20-25° C.) for 15-60 minutes. The disks separated from the moulds were gypsum disks of three centimeter in diameter and one centimeter in depth. The samples were further dried in an air circulating oven for 30 minutes at 110° C., and then for 12-24 hours at 40° C. The disks were cooled down and immersed in water for two hours. The weight of the disks before and alter immersing the disks in water was measured. The water uptake expressed in percent was used as the measure of the hydrophobing property of the polysiloxane hydrolyzate composition. The water uptake of the disks treated with the polysiloxane hydrolyzate composition was compared to the water uptake of untreated gypsum stucco that has a value of about 37-40 percent. Table 2 below sets forth the results obtained according to the above procedure.

TABLE 2

WATER UPTAKE

| Example No. | Silane Used in Preparing the Hydrolyzate | Weight Percent of Hydrolyzate vs. Stucco | Age of Aqueous Hydrolyzate Prior to Testing | Water Uptake, Percent |
|---|---|---|---|---|
| Control | None | — | — | 40.1 |
| 1 | MTM | 0.5 | Fresh | 39.8 |
|   |   |   | 2 days | 25.6 |
|   |   |   | 6 days | 21.8 |
| 8 |   | 0.75 | 2 days | 2.5 |
| 2 |   | 1 | Fresh | 13.4 |
|   |   |   | 2 days | 1.8 |

TABLE 2-continued

WATER UPTAKE

| Example No. | Silane Used in Preparing the Hydrolyzate | Weight Percent of Hydrolyzate vs. Stucco | Age of Aqueous Hydrolyzate Prior to Testing | Water Uptake, Percent |
|---|---|---|---|---|
| 9 |  | 2 | 2 days | 4.4 |
| 3 |  | 5 | Fresh | 8.4 |
|  |  |  | 2 days | 2.6 |
|  |  |  | 6 days | 2.7 |
| 4 | MTE | 0.5 | 2 days | 32.8 |
|  |  |  | 6 days | 32.6 |
| 10 |  | 0.75 | 2 days | 2.3 |
| 5 |  | 1 | 2 days | 6.9 |
|  |  |  | 9 days | 3.5 |
|  |  |  | 14 days | 1.8 |
| 11 |  | 2 | 2 days | 3.7 |
| 6 |  | 5 | 2 days | 2.8 |
|  |  |  | 6 days | 2.3 |
|  |  |  | 9 days | 2.8 |
| 12 | VTE | 0.75 | 2 days | 8.4 |
| 13 |  | 1 | 2 days | 7.9 |
| 14 |  | 2 | 2 days | 3.4 |

In Table 2, MTM designates methyltrimethoxysilane, MTE designates methyltriethoxysilane, and VTE designates vinyltriethoxysilane. Examples 1-6 and Examples 8-14 in Table 2 show that a dramatic reduction in water-absorption, and the consequent improvement in water resistance, can be obtained at various loadings of the polysiloxane hydrolyzate under base catalysis in comparison to Table 1. Table 2 also shows that good stability, and an improvement in water-absorption over time, can be obtained with the polysiloxane hydrolyzates.

Example 15

To 85 milliliter of water was added under stirring, citric acid to adjust the pH to 3.6. 15 gram of methyltrimethoxysilane (MTM) was then added drop-wise under constant stirring. The mixture was packaged prior to testing on stucco.

Example 16

To 70 milliliter of water was added under stirring, citric acid to adjust the pH to 3.6. 30 gram of methyltrimethoxysilane (MTM) was then added drop-wise under constant stirring. The mixture was packaged prior to testing on stucco.

Example 17

To 60 milliliter of water was added under stirring, citric acid to adjust the pH to 3.6. 50 gram of methyltrimethoxysilane (MTM) was then added drop-wise under constant stirring. The mixture was packaged prior to testing on stucco.

Aqueous solutions were prepared from the hydrolysates of Examples 15 to 17 so that the weight of the polysiloxane hydrolyzate based on the weight of stucco was 1 to 2 percent. To 80 gram of the aqueous solution containing the polysiloxane hydrolyzate composition was added 100 gram of stucco under vigorous stirring. No further catalyst was added, and the pH of the resulting slurry was measured to be about 5-7. The slurry was stirred for another 60 seconds and poured into disk shaped molds, then tested as described in Example 7. Table 3 shows results obtained by following the above procedure.

TABLE 3

Water Uptake

| Example No. | Silane Used in Preparing the Hydrolyzate | Weight Percent of Hydrolyzate vs. Stucco | Water Uptake, Percent |
|---|---|---|---|
| Control | None | — | 40.1 |
| 15 | MTM | 1 | 3.1 |
| 16 |  | 1 | 3.7 |
|  |  | 2 | 1.9 |
| 17 |  | 1 | 5.5 |
|  |  | 2 | 2.0 |

Examples 15-17 and Table 3 show that a reduction in water-absorption, and the consequent improvement in water resistance, was obtained at various loadings of the polysiloxane hydrolyzate starting from concentrated hydrolysed solutions.

Other variations may be made in compounds, compositions, and methods described herein without departing from the essential features of the invention. The embodiments of the invention specifically illustrated herein are exemplary only and not intended as limitations on their scope except as defined in the appended claims.

The invention claimed is:

1. A method of preparing a hydrophobic and/or water resistant mineral and/or filler material, said method comprising:
   (i) preparing a hydrolyzate containing polysiloxanes by hydrolyzing a hydrolysable silane or hydrolysable silane mixture in the presence of an acid hydrolysis catalyst and water immediately prior to
   (ii) combining the polysiloxane hydrolyzate with at least one mineral and/or filler and optionally with additional water and/or a catalyst for condensation of the hydrolysate, thereby preparing the hydrophobic and/or water resistant material,
   wherein the hydrolysable silane or hydrolysable silane mixture is present in the water in a concentration of 10 to 50 percent by weight.

2. A method according to claim 1, in which the hydrolysable silane comprises one or more silanes, each silane comprising one or more alkoxy groups and/or one or more acetoxy groups and/or one or more halide groups.

3. A method according to claim 2, wherein the hydrolysable silane is selected from at least one alkylalkoxysilane, arylalkoxysilane, and/or alkenylalkoxysilane or a mixture thereof.

4. A method according to claim 2, wherein the hydrolysable silane comprises a mixture containing at least two of methyltripropoxysilane and/or methyltrimethoxysilane and/or methyltriacetoxysilane and/or alkenyltrialkoxysilane and/or alkenyltriacetoxysilane.

5. A method according to claim 2, in which any alcohol generated during preparation of the polysiloxane hydrolyzate is removed before the polysiloxane hydrolyzate is combined with the at least one mineral and/or filler.

6. A method according to claim 2, in which the hydrolysable silane is an acetoxysilane or a mixture of acetoxysilanes.

7. A method according to claim 2, in which the hydrolysable silane is a chlorosilane or a mixture of chlorosilanes.

8. A method according to claim 6, in which any excess acid generated during preparation of the polysiloxane hydrolyzate is partially neutralized or removed before the polysiloxane hydrolyzate is combined with the at least one mineral and/or filler.

9. A method according to claim 1, wherein the pH during step (i) is 0.1-6.

10. A method according to claim 1, in which the at least one mineral and/or filler is selected from non-hydrated, partially hydrated, or hydrated, fluorides, chlorides, bromides, iodides, chromates, carbonate hydroxides, hydroxides, phosphates, hydrogen phosphates, nitrates, oxides, sulphates of sodium, potassium, magnesium, calcium, and barium, titanium dioxide, zinc oxide, aluminium oxide, aluminium trihydroxide, vermiculite, silica, fumed silica, fused silica, precipitated silica, quartz, sand, silica gel, rice hull ash, ceramic and glass beads, zeolites, hydrous calcium silicate, silica-carbon black composite, functionalized carbon nanotubes, cement, fly ash, slate flour, bentonite, clay, mica, kaolin, talc, calcium carbonate, wollastonite, polymeric fillers, rubber particles, wood flour, wood fibres, cellulose and cellulose-containing products, aramid fibres, nylon fibres, cotton fibres or glass fibres.

11. A method according to claim 1, wherein the at least one mineral and/or filler is stucco or gypsum.

12. A method according to claim 11, wherein the at least one mineral and/or filler is gypsum and the gypsum comprises one or more of calcium sulphate dehydrate, phosphogypsum and/or desulphogypsum and/or titanogypsum and/or fluorogypsum and wherein the stucco is derived from natural gypsum and/or synthetic gypsum.

13. A method according to claim 1, wherein the catalyst that is combined with the polysiloxane hydrolyzate and the at least one mineral and/or filler is a base and the pH during step (ii) is from pH 8 to pH 14.

14. A method according to claim 11, wherein step (ii) is further defined as combining the polysiloxane hydrolyzate with the stucco, the catalyst, and optionally the additional water to form a slurry.

15. A method according to claim 1, wherein the catalyst that is combined with the polysiloxane hydrolyzate and the at least one mineral and/or filler is an alkoxide of titanium, zirconium, vanadium or aluminium.

16. A method according to claim 1, wherein the catalyst that is combined with the polysiloxane hydrolyzate and the at least one mineral and/or filler is an organic compound of tin.

17. A method according to claim 1, wherein the catalyst that is combined with the polysiloxane hydrolyzate and the at least one mineral and/or filler is a fluoride salt.

18. A method according to claim 1, wherein the catalyst that is combined with the polysiloxane hydrolyzate and the at least one mineral and/or filler comprises a base and an alkoxide of titanium, zirconium, vanadium or aluminium, an organic compound of tin, or a fluoride salt.

19. A method according to claim 1, wherein the hydrolyzable silane mixture comprises a silanol, a silanediol, a silanetriol, a hydroxyl functional polydimethylsiloxane, or an alkoxy functional polydimethylsiloxane.

20. A method in accordance with claim 1, in which at least one additive comprising starch, a foaming agent, a wetting agent, an accelerator, a retarder, paper, pulp, a viscosity modifying agent, an anti-burning agent, a non-silicon atom containing water-resisting chemical, glass fibres, a fire-resistance enhancer, a polymeric compound and/or uncalcined gypsum is additionally introduced during step (ii).

21. A method according to claim 11, wherein the catalyst for condensation of the hydrolyzate is mixed with the water, and the hydrolysable silane or hydrolysable silane mixture, and the stucco.

22. A method according to claim 11 further comprising the step of discharging the hydrophobic and/or water resistant gypsum onto a support or mould and the step of drying.

23. A hydrophobic and/or water resistant gypsum prepared according to the method of claim 22.

24. A method according to claim 6, in which the acetoxysilane or the mixture of acetoxysilanes additionally comprise one or more chloro groups per molecule.

25. A method according to claim 7, in which any excess acid generated during preparation of the polysiloxane hydrolyzate is partially neutralized or removed before the polysiloxane hydrolyzate is combined with the at least one mineral and/or filler.

26. A method of preparing a hydrophobic and/or water resistant mineral and/or filler material, said method comprising:
  (i) preparing a hydrolyzate containing polysiloxanes by hydrolyzing a hydrolysable silane or hydrolysable silane mixture in the presence of an acid hydrolysis catalyst and water and in the presence of a silanol, a silanediol, a silanetriol, a hydroxyl functional polydimethylsiloxane, or an alkoxy functional polydimethylsiloxane immediately prior to
  (ii) combining the polysiloxane hydrolyzate with at least one mineral and/or filler and optionally with additional water and/or a catalyst for condensation of the hydrolysate, thereby preparing the hydrophobic and/or water resistant material,
  wherein the hydrolysable silane or hydrolysable silane mixture is present in the water in a concentration of 10 to 50 percent by weight.

27. A method according to claim 26, in which the hydrolysable silane comprises one or more silanes, each silane comprising one or more alkoxy groups and/or one or more acetoxy groups and/or one or more halide groups.

28. A method according to claim 27, wherein the hydrolysable silane is selected from at least one alkylalkoxysilane, arylalkoxysilane, and/or alkenylalkoxysilane or a mixture thereof.

29. A method of preparing a hydrophobic and/or water resistant gypsum from stucco, said method comprising:
  (i) preparing a hydrolyzate containing polysiloxanes by combining a hydroxy-terminated polydimethylsiloxane with an alkyltrialkoxysilane in water in the presence of an acid hydrolysis catalyst immediately prior to addition of the stucco, wherein the alkyltrialkoxysilane is present in a concentration of 10 to 50 percent by weight with the water;
  (ii) combining the hydrolyzate with the stucco to form an aqueous solution having 0.5 to 5 parts by weight of the hydrolyzate per 100 parts by weight of the stucco and to prepare the hydrophobic and/or water resistant gypsum material.

30. A method as set forth in claim 1 wherein the polysiloxane hydrolyzate comprises a first compound having the formula $CH_3Si(OH)_3$ and a second compound having the formula $(HO)_2CH_3SiOSiCH_3(OH)_2$.

31. A method as set forth in claim 1 wherein the water is present in an amount of from 7.5 to 68 moles of water per mole of silane and from 1.5 to 14 moles of water per mole of atomic Si.

* * * * *